(12) United States Patent
Liang (10) Patent No.: US 10,565,484 B2
(45) Date of Patent: Feb. 18, 2020

(54) LOW-ENERGY CONSUMPTION BLUETOOTH IOT DEVICE

(71) Applicant: Chun Wei Liang, Taipei (TW)

(72) Inventor: Chun Wei Liang, Taipei (TW)

( * ) Notice: Subject to any disclaimer, the term of this patent is extended or adjusted under 35 U.S.C. 154(b) by 0 days.

(21) Appl. No.: 16/059,082

(22) Filed: Aug. 9, 2018

(65) Prior Publication Data

US 2019/0050696 A1 Feb. 14, 2019

(30) Foreign Application Priority Data

Aug. 9, 2017 (TW) .............................. 106126966 A (51) Int. Cl.
| | | |
|---|---|---|
| *G06K 19/06* | (2006.01) | |
| *G06K 7/10* | (2006.01) | |
| *H04W 4/80* | (2018.01) | |
| *G06Q 10/00* | (2012.01) | |
| *H04W 4/38* | (2018.01) | |
| *H04W 4/70* | (2018.01) | |

(52) U.S. Cl.
CPC ....... *G06K 19/06037* (2013.01); *G06Q 10/00* (2013.01); *H04W 4/80* (2018.02); *H04W 4/38* (2018.02); *H04W 4/70* (2018.02)

(58) Field of Classification Search
USPC ........................................ 235/451, 492, 494
See application file for complete search history.

(56) References Cited

U.S. PATENT DOCUMENTS

| | | | | |
|---|---|---|---|---|
| 2015/0358777 A1* | 12/2015 | Gupta | ................ | H04L 12/2807 370/254 |
| 2017/0126834 A1* | 5/2017 | Fransen | ................ | H04L 67/303 |
| 2017/0331732 A1* | 11/2017 | Cheng | .................... | H04L 45/74 |
| 2018/0227789 A1* | 8/2018 | Kothapalli | ........ | H04W 28/0215 |

* cited by examiner

*Primary Examiner* — Tuyen K Vo
(74) *Attorney, Agent, or Firm* — Muncy, Geissler, Olds & Lowe, P.C.

(57) ABSTRACT

A low-energy consumption Bluetooth IoT device comprises an input interface, a processing module, a Bluetooth module and a display module. An external device transmits a parameter code correlated with a current external information to the processing module through the input interface. The processing module searches out a current bit-series code corresponding to the parameter code from a plurality of bit-series codes pre-stored in the processing module and converts the current bit-series code into a two-dimensional graphic code. A mobile device receives the parameter code broadcasted by the Bluetooth module and uploads the parameter code to a cloud server and then the cloud server converts the parameter code into a current cloud information. The current cloud information is correlated with the current external information.

20 Claims, 5 Drawing Sheets

LOW-ENERGY CONSUMPTION BLUETOOTH IOT DEVICE

FIELD OF THE INVENTION

The present invention is related to a low-energy consumption Bluetooth IoT device, and more particularly to a low-energy consumption Bluetooth IoT device with a dynamic Quick Response Code display device.

BACKGROUND OF THE INVENTION

Figure 5:
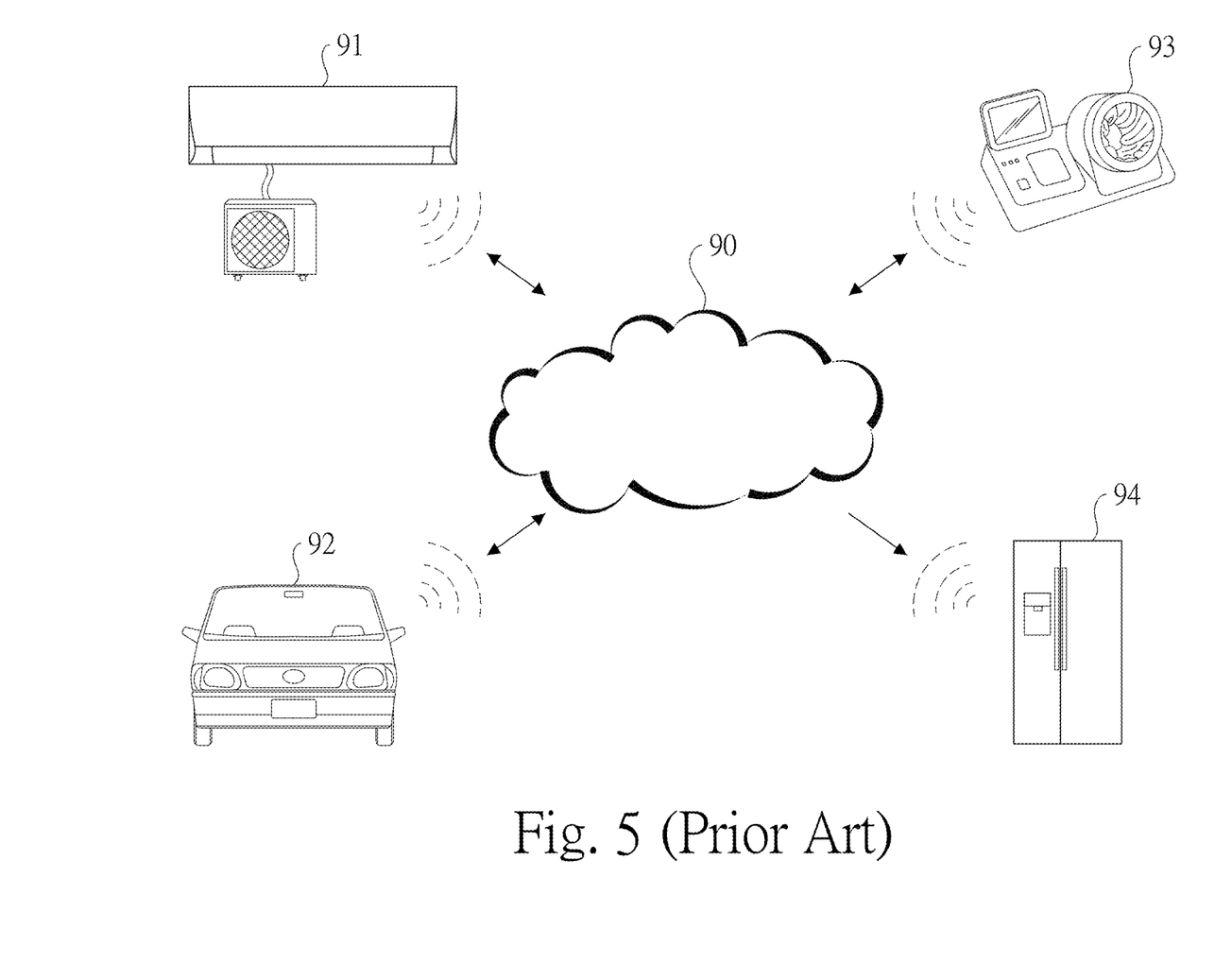
FIG. 5 is a schematic view showing the application of a device of IoT of prior art.

With the development of wireless network transmission technology and the popularity of mobile devices, the work and services that people can obtain through the Internet become more and more popular and diverse. At present time, there is a trend in applying the Internet or network to common objects or devices, that is, the concept of the Internet of Things (IoT), in which a user can connect a common object or device with a cloud server by using a digital application, so as to manage or control the objects or devices through the cloud server and obtain corresponding information or service. Referring to FIG. 5, it is a schematic view showing the application of a device of IoT in prior art. It shows that various objects or devices, such as an air conditioner 91, a car 92, a sphygmomanometer 93, and a refrigerator 94 . . . etc, are provided with the function of accessing Internet function via WiFi or 3G, 4G in prior art, so that the objects, such as air-conditioning 91, the car 92, the sphygmomanometer 93 and the refrigerator 94, can be used to upload information to a cloud server 90 respectively.

However, in order to connect an object or device to a cloud server, an object or device must have functions of data processing and network transmission to process the tag of the object or data generated by the device into data that can be read by a cloud server, and the data is transmitted via Internet. On the other hand, most of the existing objects or devices do not have such two functions. As a result, the design and process of existing object must be significantly improved for accomplishing the purpose of the Internet of Things, and the basic cost for each unit, the cost for network connection and the cost for their maintenance will be greatly increased. Moreover, some objects or devices regarding the Internet of Things are only required to upload data of the object or device to the cloud server in one-way transmission without the need of two-way transmission between the object or device and the cloud server. In other words, for the objects or devices with such demanding, it is not necessary to provide function of accessing Internet by using WiFi or 3G, 4G because the cost of such investment is too high and is not economical.

In view of this, the present invention provides a low-energy consumption Bluetooth IoT device that is easy to assemble, and is able to overcome the above disadvantages and has the advantages of low manufacturing cost, so as to be advantageous both in the convenience for use and economical efficiency. Accordingly, the present invention is provided.

SUMMARY OF THE INVENTION

In order to solve above technical problems, the present invention provides a low-energy consumption Bluetooth IoT device as a bridge between an external device and a mobile device. The external information of the external devices is transmitted to the mobile device by means of the low-energy consumption Bluetooth IoT device of the present invention in a broadcasting way, or displayed in the form of a two-dimensional graphic code to be scanned by the mobile device, so that the external information is uploaded to a cloud server through the function of accessing Internet provided by the mobile device. The low-energy consumption Bluetooth IoT device of the present invention is light in weight and power-saving, and is capable of assisting a plurality of existing external devices to be connected with Internet with no need to install the network transmission component and the data processing component. The low-energy consumption Bluetooth IoT device of the present invention can be customized according to requirements of different external devices, and the mobile device is used as a medium for connecting the objects or devices with the cloud server, so that the present invention can be applied to various working circumstances and has a wide range of applications.

In order to fulfill above purpose, the present invention provides a low-energy consumption Bluetooth IoT device, comprising: an input interface, a processing module, a Bluetooth module, and a display module, wherein the input interface is connected with an external device for receiving a current external message code of the external device, wherein the current external message code is correlated with a current external information of the external device and a current parameter code of the external device. The processing module is connected with the input interface, wherein the processing module converts the current external message code into the current parameter code. The Bluetooth module is connected with the processing module, wherein the processing module transmits the current parameter code to the Bluetooth module, and the Bluetooth module broadcasts the current parameter code, wherein a mobile device receives the current parameter code by a mobile-device Bluetooth module of the mobile device and uploads the current parameter code to a cloud server, the cloud server converts the current parameter code into a current cloud information and stores the current cloud information in the cloud server. The display module is connected with the processing module, wherein a plurality of bit-series codes are pre-stored in the processing module, and the processing module searches out a current bit-series code corresponding to the current parameter code from the plurality of bit-series codes, and then the processing module converts the current bit-series code into a current two-dimensional graphic code and transmits the current two-dimensional graphic code to the display module to display the current two-dimensional graphic code, wherein when the mobile-device Bluetooth module is unable to successfully receive the current parameter code, a mobile device camera module of the mobile device is able to read the current two-dimensional graphic code displayed by the display module; wherein (1) the mobile device converts the current two-dimensional graphic code into the current cloud information, and then uploads the current cloud information to the cloud server, and the current cloud information is stored in the cloud server; or (2) the mobile device uploads the current two-dimensional graphic code to the cloud server, and the cloud server converts the current two-dimensional graphic code into the current cloud information and stores the current cloud information in the cloud server; wherein the current cloud information is correlated with the current external information of the external device.

Moreover, the present invention further provides a low-energy consumption Bluetooth IoT device, comprising: an input interface, a processing module, a Bluetooth module, and a display module, wherein the input interface is connected with an external device for receiving a current parameter code of the external device, wherein the current parameter code is correlated with a current external information of the external device. The processing module is connected with the input interface. The Bluetooth module is connected with the processing module, wherein the processing module transmits the current parameter code to the Bluetooth module, and the Bluetooth module broadcasts the current parameter code, wherein a mobile device receives the current parameter code by a mobile-device Bluetooth module of the mobile device and uploads the current parameter code to a cloud server, the cloud server converts the current parameter code into a current cloud information and stores the current cloud information in the cloud server. The display module is connected with the processing module, wherein a plurality of bit-series codes are pre-stored in the processing module, and the processing module searches out a current bit-series code corresponding the current parameter code from the plurality of bit-series codes, and then the processing module converts the current bit-series codes into a current two-dimensional graphic code and transmits the current two-dimensional graphic code to the display module to display the current two-dimensional graphic code, wherein when the mobile-device Bluetooth module is unable to successfully receive the current parameter code, a mobile device camera module of the mobile device is able to read the current two-dimensional graphic code displayed by the display module; wherein (1) the mobile device converts the current two-dimensional graphic code into the current cloud information, and then uploads the current cloud information to the cloud server, and the current cloud information is stored in the cloud server; or (2) the mobile device uploads the current two-dimensional graphic code to the cloud server, and the cloud server converts the current two-dimensional graphic code into the current cloud information and stores the current cloud information in the cloud server; wherein the current cloud information is correlated with the current external information of the external device.

Inimplementation, the Bluetooth module is an iBeacon module compatible with Bluetooth Low Energy 4.0 protocol (Bluetooth Low Energy 4.0).

Inimplementation, the input interface is at least one selected from the group consisting of: a universal serial bus (USB) interface, a PS/2 interface, and an RS232 interface.

In implementation, the current two-dimensional graphic code is a Quick Response Code.

In implementation, the display module is an electronic paper display.

Implementation, the current two-dimensional graphic code displayed by the display module is dynamically changing according to the change of the current external information of the external device or dynamically changing over a time interval.

Imlementation, the plurality of bit-series codes are converted from a plurality of two-dimensional graphic codes, and the plurality of two-dimensional graphic codes are converted from a plurality of cloud information; wherein the plurality of cloud information are corresponding to a plurality of parameter codes and a plurality of external information of the external device, wherein the plurality of bit-series codes are pre-stored in the processing module by connecting an external installation device to the input interface.

In implementation, each of the plurality of cloud information is an URL.

In implementation, the current cloud information is a current URL, and a web page of the current URL is correlated with the current external information of the external device.

In implementation, further comprising a power module for supplying the power required by the low-energy consumption Bluetooth IoT device The present invention will be understood more fully by reference to the detailed description of the drawings and the preferred embodiments below.

DETAILED DESCRIPTIONS OF PREFERRED EMBODIMENTS

The low-energy consumption Bluetooth IoT device of the present invention serves as a bridge between an object and a mobile device, and the information of the object is transmitted to the mobile device by means of the low-energy consumption Bluetooth IoT device of the present invention a broadcasting way, or the information can be scanned by mobile device in a way of displaying the two-dimensional graphic code. And then the information is uploaded by the mobile device to a cloud server via interne. For example, a blood pressure value and a heartbeat value measured by a sphygmomanometer can be uploaded to the cloud server by the low-energy consumption Bluetooth IoT device of the present invention and the mobile device. Before using the low-energy consumption Bluetooth IoT device of the present invention, some preparations and a pre-installation procedure are required. Taking the sphygmomanometer as an example, the present invention firstly forms an URL from the information such as a web link of the sphygmomanometer, the blood pressure value, and the heartbeat value by an external installation device. Since the blood pressure values and the heartbeat values measured by the sphygmomanometer may have the specific ranges respectively, the external installation device of the present invention forms a plurality of URLs with the information of the web link of the sphygmomanometer and with different blood pressure values and heartbeat values respectively. Hence each of the URLs has different parameter codes, which represents different blood pressure values and/or heartbeat values. For example:

https://www.abcdef.com/WebservicePGM210K0000000000 (the first URL)
https://www.abcdef.com/WebservicePGM210K0000000001 (the second URL)
https://www.abcdef.com/WebservicePGM210K0000100000 (the third URL)

Figure 1:
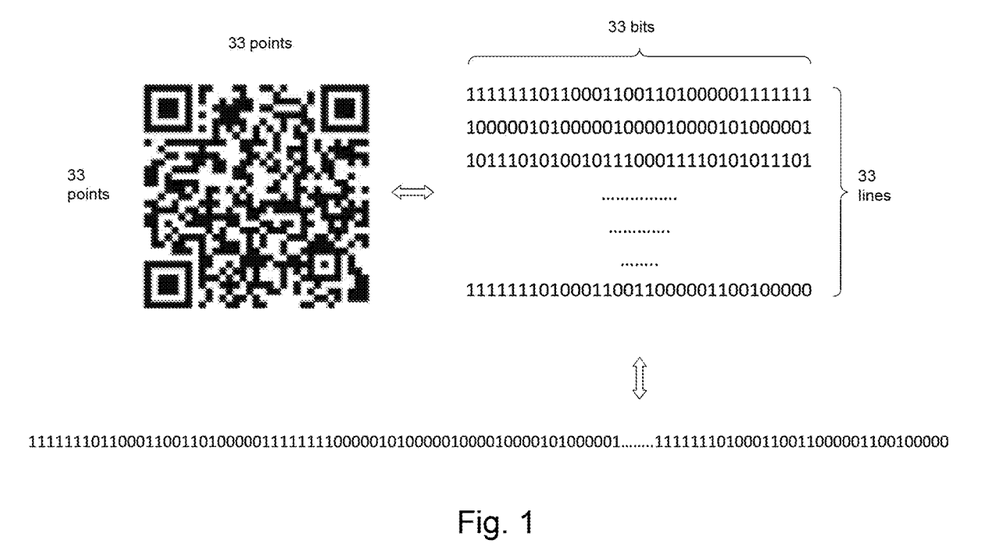
FIG. 1 shows the conversion of the Quick Response Code, the bit matrix, and the bit-series code.
Figure 2:
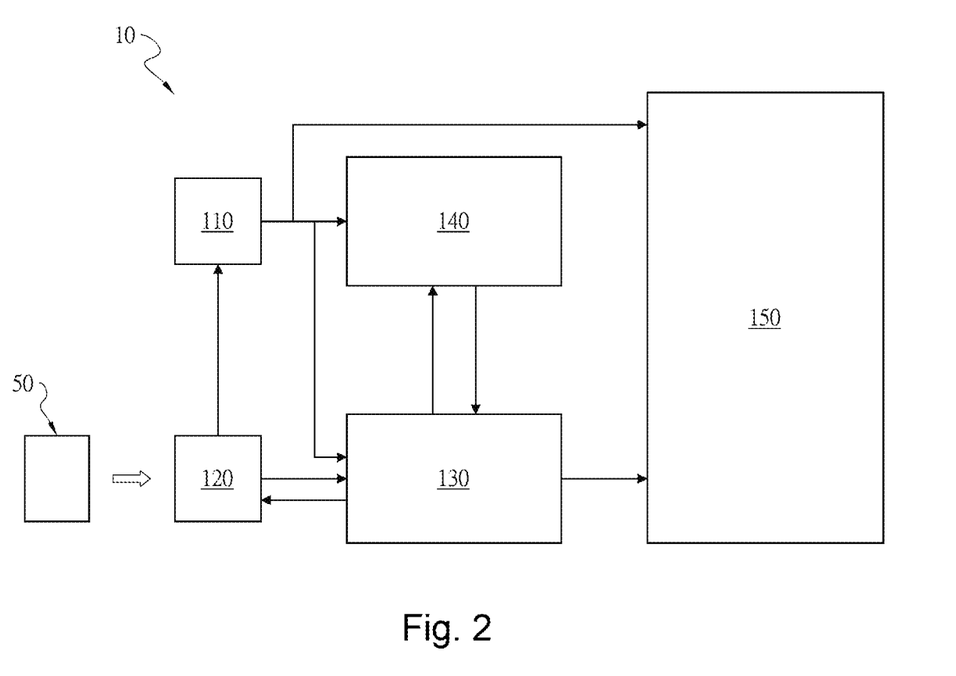
FIG. 2 is a schematic view showing the installation and structure of a specific embodiment of the low-energy consumption Bluetooth IoT device of the present invention.

They are examples of three URLs, wherein https://www.abcdef.com is the website of the production company of the sphygmomanometer. The PGM210K is the model of the sphygmomanometer; wherein 0000000000 (referred to as a parameter code in the present invention) in the first URL represents the systolic blood pressure 125 mmHg, the diastolic blood pressure 84 mmHg, and the heartbeat 72. The parameter code 0000000001 of the second URL represents the systolic blood pressure 125 mmHg, the diastolic blood pressure 84 mmHg, and the heartbeat 73. The parameter code 0000100000 of the third URL represents the systolic blood pressure 126 mmHg, the diastolic blood pressure 84 mmHg, and the heartbeat 72. When the user connects to the first URL (the web page) by a browser, the information of the systolic blood pressure 125 mmHg, the diastolic pressure 84 mmHg, and the heartbeat 72 are shown; while connects to the second URL (the web page), the information of systolic blood pressure 125 mmHg, the diastolic blood pressure 84 mmHg, and the heartbeat 73 are shown. And then the external installation device of the present invention converts the plurality of URLs into a plurality of QR Codes (Quick Response Codes). These Quick Response Codes can be decoded respectively into a plurality of URLs. Please refer to FIG. 1 which shows the conversion of the Quick Response Code, the bit matrix and the bit-series code. On the upper left of FIG. 1 is a Quick Response Code. The Quick Response Code is converted from an URL (for example, the third URL). The Quick Response Code on the upper left of FIG. 1 has 33 points on each side. If the black point is regarded as 1 and the white point is regarded as 0 (in other embodiments, the black point may be regarded as 0, while the white point may be regarded as 1), the Quick Response Code may be corresponding to a bit matrix on the upper right of FIG. 1 (the value of each bit is 1 or 0). The bit matrix on the upper right of FIG. 1 can also be converted into a one-dimensional bit-series code on the bottom of FIG. 1, wherein the bit-series code has 33×33 bits. The 1st bit to the 33th bit of the bit-series codes are the first row of the bit matrix. The 34th bit to the 66th bit of the bit-series codes are the second row of the bit matrix, and so on. The 1057th bit to the 1089th bit of the bit string codes are the 33th row of the bit matrix. Furthermore, the external installation device of the present invention further uses a conversion (referring to as a graphic-code-to-bit-series conversion in the present invention; and a conversion which converts a one-dimensional bit-series code into a Quick Response Code is referring to as an reverse graphic-code-to-bit-series conversion in the present invention) which converts a Quick Response Code into a one-dimensional bit-series code to convert the plurality of Quick Response Codes respectively into a plurality of bit-series codes. Please also refer to FIG. 2, which shows a schematic diagram of the installation and structure of an embodiment of a low-energy consumption Bluetooth IoT device of the present invention. A low-energy consumption Bluetooth IoT device 10 of the present invention comprises a power module 110, an input interface 120, a processing module 130, a Bluetooth module 140, and a display module 150. The power module 110 is connected with the input interface 120, the processing module 130, the Bluetooth module 140, and the display module 150 respectively. The processing module 130 is connected with the input interface 120, the Bluetooth module 140, and the display module 150 respectively. An external installation device 50 of the present invention firstly forms a plurality of URLs with the information of the web link of the sphygmomanometer and with different blood pressure values and heartbeat values respectively. And then the plurality of URLs are converted into a plurality of Quick Response Codes respectively. Then, the plurality of Quick Response Codes are respectively converted into a plurality of one-dimensional bit-series codes by the conversion (the graphic bit-series conversion). A pre-installation is performed by connecting the input interface 120 with the low-energy consumption Bluetooth IoT device 10 of the present invention so that the plurality of bit-series codes are stored in the processing module 130. Since the Quick Response Code requires a large storage space, the present invention firstly converts the plurality of Quick Response Codes into the plurality of bit-series codes, and then the plurality of bit-series codes are stored in the processing module 130 by pre-installation. It can save a lot of storage space comparing with directly storing the Quick Response Code. In some embodiments, the power module 110 is not required; when the low-energy consumption Bluetooth IoT device 10 of the present invention is pre-installed by the external installation device 50 (that is, when the external installation device 50 is connected with the input interface 120), through the input interface 120, the external installation device 50 may directly provide the power for the low-energy consumption Bluetooth IoT device 10.

Figure 3:
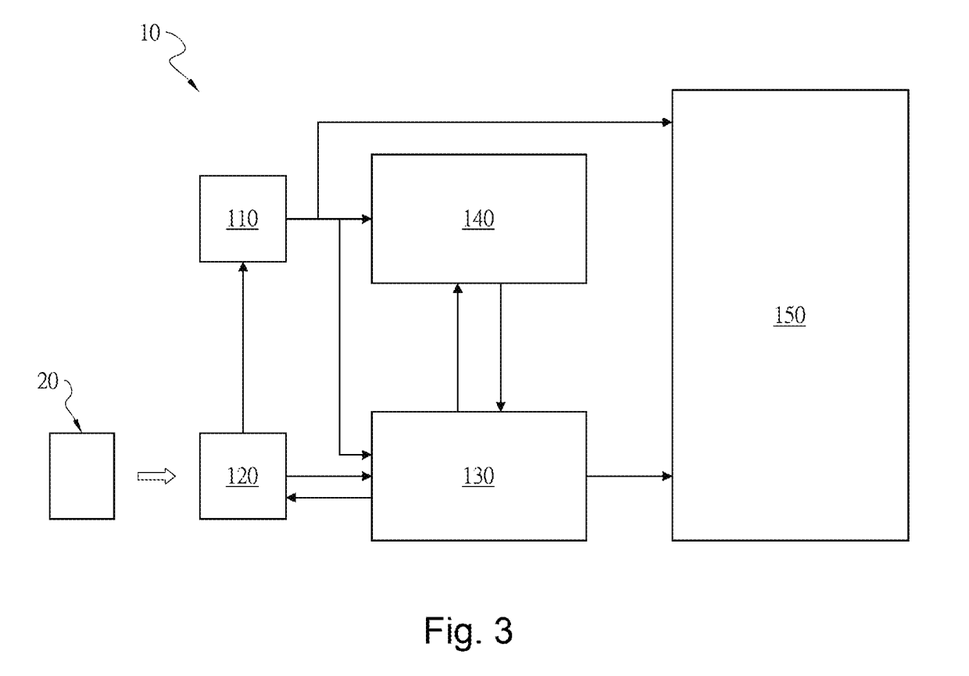
FIG. 3 is a schematic view showing the application and structure of a specific embodiment of the low-energy consumption Bluetooth IoT device of the present invention.
Figure 4:
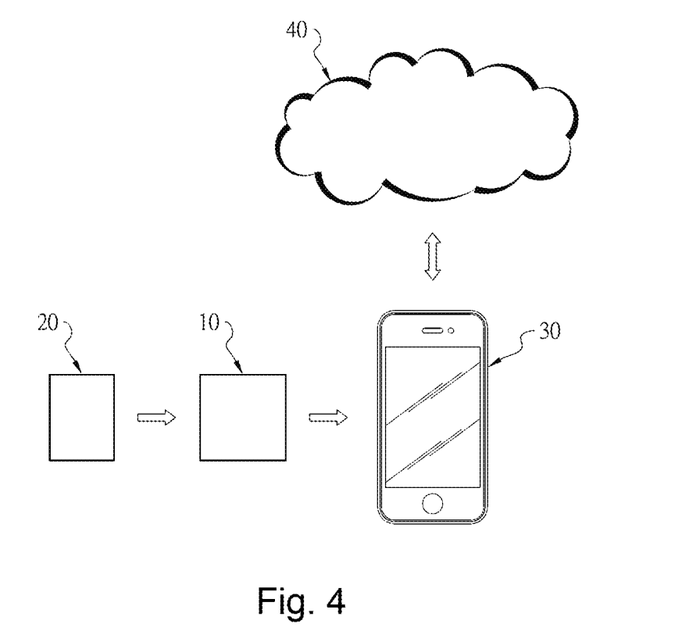
FIG. 4 is a schematic view showing the application a specific embodiment of the low-energy consumption Bluetooth IoT device of the present invention.

Referring to FIG. 3, which is a schematic view of the application and structure of a specific embodiment of a low-energy consumption Bluetooth IoT device of the present invention. The main structure of a low-energy consumption Bluetooth IoT device 10 of the present invention in the embodiment of FIG. 3 is basically the same as that of the embodiment of FIG. 2, except that the input interface 120 is connected with an external device 20. Here, take an example, the external device 20 is a sphygmomanometer. When a user uses a sphygmomanometer (the external device 20) to measure the blood pressure and the heart rate, the sphygmomanometer displays the values of the systolic blood pressure, the diastolic blood pressure, and the heart rate. The instant values of systolic blood pressure, the diastolic blood pressure, and the heartbeat are referred to as an external information (for example, the systolic blood pressure 126 mmHg, the diastolic blood pressure 84 mmHg, and the heartbeat 72) in the present invention. In one embodiment, the sphygmomanometer (the external device 20) transmits an external message code to the processing module 130 via the input interface 120, wherein the external message code is correlated with a parameter code (for example, 0000100000). The processing module 130 converts the external message code into the corresponding parameter code; while in another embodiment, the external message code may be the same as the parameter code, that is, the sphygmomanometer (the external device 20) directly transmits the parameter code (for example, 0000100000) to the processing module 130 via the input interface 120. The processing module 130 transmits the parameter code to a Bluetooth module 140 for the Bluetooth module 140 to broadcast the parameter code. Please also refer to FIG. 4, which is a schematic view of an application of a low-energy consumption Bluetooth IoT device according to a specific embodiment of the present invention. When a mobile device 30 is within the broadcast distance range of the Bluetooth module 140, the mobile device 30 can receive the parameter code broadcasted by the Bluetooth module 140 by a mobile-device Bluetooth module in the mobile device 30, and then the parameter code is transmitted to a cloud server 40, wherein (1) a cloud correspondence table is stored in the cloud server 40; the cloud server 40 converts the parameter code into an URL (for example, the third URL) according to the cloud correspondence table, and stores the URL; the information, such as the time of measurement and etc., is simultaneously recorded; or (2) a corresponding conversion program is stored in the cloud server 40; the corresponding conversion program converts the parameter code into an URL (for example, the third URL), and then stores the URL; the information, such as the time of measurement and etc., is simultaneously recorded. The user can view the systolic blood pressure, the diastolic blood pressure, the heartbeat (for example, the systolic blood pressure 126 mmHg, the diastolic blood pressure 84 mmHg, the heartbeat 72), the time of measurement and other related information at any time by connecting to the URL (for example, the third URL) with a browser. Because the Bluetooth module 140 broadcasts the parameter code, there is no need to pair between the Bluetooth module 140 and the mobile device 30, thereby the time required for pairing is reduced, and thus the response speed is very fast. However, at a very low ratio, the mobile-device Bluetooth module in the mobile device 30 may not be able to successfully receive the parameter code broadcasted by the Bluetooth module 140. In order to solve the problem in which the mobile device 30 fails to receive, the present invention provides a technical solution described below. The processing module 130 searches out a bit-series code (for example, the bit-series code on the bottom of FIG. 1) corresponding to the parameter codes from the plurality of bit-series codes stored in the processing module 130. Then the processing module 130 converts the bit-series code into a Quick Response Code (using the reverse graphic-code-to-bit-series conversion) and transmits the Quick Response Code to the display module 150, so that the display module 150 displays the Quick Response Code (for example, the Quick Response Code on the upper left of FIG. 1). In an embodiment, the user uses a mobile device camera module of the mobile device 30 to read the Quick Response Code displayed by the display module 150, and the mobile device 30 decodes the Quick Response Code into an URL (for example, the third URL), then the URL is uploaded to the cloud server 40 and saved in the cloud server 40; in the mean while, other information, such as the time of measurement and etc., is also be saved in the cloud server 40. In another embodiment, the user uses the mobile device camera module of the mobile device 30 to read the Quick Response Code displayed by the display module 150, and the mobile device 30 uploads the Quick Response Code to the cloud server 40. Then, the cloud server 40 decodes the Quick Response Code into an URL (for example, the third URL), and stores the URL and the information, such as the time of measurement and etc., is simultaneously recorded. When the user connects to the URL (for example, the third URL) with a browser, the information of the systolic blood pressure, the diastolic blood pressure and the heartbeat (for example, 126 mmHg of systolic blood pressure, 84 mmHg of diastolic blood pressure, heartbeat 72) is shown on a web page. In some embodiments, the power module 110 is not required; when the low-energy consumption Bluetooth IoT device 10 is used (that is, when the external device 20 is connected with the input interface 120), the external device 20 may directly provide the power for the low-energy consumption Bluetooth IoT device 10.

In the above embodiment, a mobile application (app) can be installed in the mobile device 30. Users can enter information, such as their name, in the mobile application. When a user wants to start to measure the blood pressure or the heartbeat by using the sphygmomanometer (the external device 20), the user firstly selects the relevant information such as name of the person being measured in the mobile application, and then executes the measurement When the mobile device 30 uploads the parameter code, the URL, or the Quick Response Code to the cloud server 40, the mobile device 30 may also upload the relevant information, such as the name of the person being measured, to the cloud server 40. On the web page of the URL, the relevant information, such as the name of the person being measured, may be shown.

In one embodiment, in order to avoid infringement of privacy rights, the URL may be protected by an account and its corresponding password.

In the above embodiments, the Quick Response Code may also be a two-dimensional code with other formats, such as PDF417 barcode, Hanxin code, Aztec Code, Data Matrix or other two-dimensional barcode.

In one embodiment, the Bluetooth module 140 is an iBeacon module compatible with the Bluetooth 4.0 protocol (Bluetooth Low Energy 4.0). A major parameter (Major) and a minor parameter (minor) are included in the iBeacon module. The parameter code can be composed of the major parameter combined with the minor parameter.

The preferred embodiment of the power module 110 may further comprise a battery holder for connecting one or more batteries, and the battery can be a disposable battery or a rechargeable battery. When the rechargeable battery is used, the rechargeable battery can be charged by the power provided by the external device 20 (or the external installation device 50) through the input interface 120. The power module 110 may further comprise a power cord connector for connecting to an external power source, such as a mains supply.

Input interface 120 may be any common data transfer interface. In a preferred embodiment, the input interface 120 is at least one selected from the group consisting of: a universal serial bus (USB) interface, a PS/2 interface, and an RS232 interface.

The processing module 130 can be a microcontroller (MCU), including a processor, one or more memories, a timer, and a plurality of data transmission interfaces.

The display module 150 can be any thin electronic display, preferably a low energy consumption thin electronic display, such as an electronic paper display (E-Ink Panel).

The mobile device 30 can be a smart phone or a tablet.

In one embodiment, the Quick Response Code displayed by the display module 150 is dynamically changing according to the change of the current external information of the external device 20 or dynamically changing over a time interval.

The low-energy consumption Bluetooth IoT device provided by the present invention has a wide range of applications, such as food service places, entertainment industry, the health care industry, the agriculture and animal husbandry, and the vehicle transportation industry. The low-energy consumption Bluetooth IoT device 10 of the present invention can be connected with a variety of external devices 20. The external information of the external device 20 can be uploaded to the cloud server 40 through the low-energy consumption Bluetooth IoT device 10 of the present invention and the mobile device 30.

A specific embodiment of the low-energy consumption Bluetooth IoT device 10 of the present invention applying to the medical industry is described below. The present invention can assist the health status record of the one being measured (patient or health examiner) to record the change of his/her health status over time. In the cloud server 40, the data related to the measurement such as health data analysis or appointment registration can be provided through data analysis. The external device 20 may be other medical measuring instruments in addition to the sphygmomanometer of the above embodiments, such as an electrocardiograph, an oximeter, a blood glucose meter, a body fat monitor, and a high-weight scale.

One embodiment of the low-energy consumption Bluetooth IoT device 10 of the present invention applying to the vehicle transportation industry is as a recorder for a plurality of sensors of a vehicle. A vehicle in the present time provides many sensors, and the sensors are all connected to an electronic control unit of vehicle. When the output interface of the electronic control unit is connected with the input interface 120 of the low-energy consumption Bluetooth IoT device 10, the plurality of sensors and the electronic control unit provided on the vehicle can be regarded as the external device 20. The dynamic information of the plurality of sensors may be uploaded to the cloud server 40 through the mobile device 30. Through the data analysis on the cloud server 40, the services such as vehicle status list and scheduled vehicle maintenance can be provided.

In a specific embodiment, the low-energy consumption Bluetooth IoT device 10 of the present invention is applicable to the food service industry and entertainment industry. The object of the Internet of Things (IoS) may also be a voucher or a coupon. The external device 20 may be a point of service (POS) of a restaurant. For example, a parameter code 0000100000 represents the voucher/coupon of lamb for the ABC restaurant on Aug. 1, 2017. The point of service (external device 20) located at the counter of the restaurant is connected with the input interface 120 of the low-energy consumption Bluetooth IoT device 10. The point of service (external device 20) transmits the parameter code to the processing module 130. The Bluetooth module 140 broadcasts the parameter code (for example, the parameter code 0000100000). The consumer can firstly download the mobile application (app) with the mobile device 30, and then executes the mobile app in front of the counter of the restaurant and select the voucher/coupon. At this time, a mobile-device Bluetooth module of the mobile device 30 receives the parameter code broadcasted by the Bluetooth module 140, and transmits the parameter code to the cloud server 40, and in the mean while, transmits the relevant identification information of the consumer's mobile device 30 and the information of the voucher/coupon, which indicates that the consumer has used the voucher/coupon. The cloud server 40 converts the parameter code into an URL according to the cloud correspondence table or by the corresponding conversion program, and stores the URL, and simultaneously records information, such as the time when the consumer used the voucher/coupon. In this embodiment, when the mobile device 30 receives the parameter code, the mobile application can also convert the parameter code into an URL or convert it into a Quick Response Code to be displayed on the screen of the mobile device 30. In addition, when the mobile device 30 cannot successfully receive the parameter code broadcasted by the Bluetooth module 140, the mobile device camera module of the mobile device 30 can also be used to read the Quick Response Code displayed by the display module 150. The mobile device 30 decodes the Quick Response Code into the URL, and uploads it to the cloud server 40; or the mobile device 30 uploads the Quick Response Code to the cloud server 40, and the cloud server 40 decodes the Quick Response Code into the URL.

In one embodiment, the Quick Response Code displayed by the display module 150 varies over time. For example, the low-energy consumption Bluetooth IoT device 10 of the present invention is applied in the food and entertainment industry. The external device 20 is a point of service (PoS) at the counter of restaurant. The object of Internet of Things (IoT) is a time-interval voucher which is a voucher that dynamically changes its content over a time interval (dynamically changing over a time interval). A time-interval parameter code (dynamically changing over a time interval) corresponds to the time-interval voucher. For example, the time-interval parameter code 0000000001 on Aug. 2, 2017 represents the steak time-interval voucher for the ABC restaurant; and the time-interval parameter code 0000000010 on Aug. 3, 2017 represents the chicken fillet time-interval voucher for the ABC restaurant. The endpoint information service (the external device 20) at the counter of restaurant is connected with the input interface 120 of the low-energy consumption Bluetooth IoT device 10. The point of service (the external device 20) transmits the time-interval parameter code to the processing module 130. The Bluetooth module 140 broadcasts the time-interval parameter code, and the time-interval parameter code is dynamically changing over a time interval (for example, the time-interval parameter code 0000000001 is broadcasting on Aug. 2, 2017; and the time-interval parameter code 0000000010 is broadcasting on Aug. 3, 2017). Consumer executes the mobile app in front of the counter of the restaurant and chooses a voucher, wherein the content of the voucher is dynamically changing over a time interval.

The above embodiments all use the URL as an example. When taking the sphygmomanometer as an example, in the present invention, the externally installing device 50 firstly for is an URL from the related information, such as the web link of the sphygmomanometer, the blood pressure value, and the heartbeat value of the sphygmomanometer. In some other embodiments, the above information may be converted to other different data type. For example, in some embodiments of the present invention, firstly the external installation device 50 forms a cloud information from the information, such as the web link of the sphygmomanometer, the blood pressure value, and the heartbeat value, wherein the cloud information is correlated with the information of the web link of the sphygmomanometer, the blood pressure value and the heartbeat value. When the mobile-device Bluetooth module of the mobile device receives the parameter code and the mobile device uploads the parameter code to the cloud server, the cloud server converts the parameter code into cloud information and stores the cloud information in the cloud server, wherein when the mobile-device Bluetooth module cannot successfully receive the parameter code, the two-dimensional graphic code displayed by the display module can be read by the mobile device camera module of the mobile device; wherein (1) the mobile device converts the two-dimensional graphic code into the cloud information and then uploads the cloud information to the cloud server, and the cloud information is stored in the cloud server; or (2) the mobile device uploads the two-dimensional graphic code to the cloud server, and the cloud server converts the two-dimensional graphic code into cloud information and stores the cloud information in the cloud server; wherein the cloud information is correlated with the external information of the external device.

Accordingly, the present invention has the following advantages:
1. The low-energy consumption Bluetooth IoT device provided by the present invention is small in size, light in weight, easy to carry, and convenient for using in various application.
2. The low-energy consumption Bluetooth IoT device provided by the invention uses a low-energy power module, so that it can be used for a long time without replacing the battery or charging.

3. The low-energy consumption Bluetooth IoT device provided by the present invention uses a common data transmission interface and is suitable for various external devices.

4. The low-energy consumption Bluetooth IoT device provided by the present invention not only can broadcast data through Bluetooth, but also can provide a corresponding two-dimensional graphic code, so that user can select to receive data through the Bluetooth network of the mobile device or can also select to get the information by scanning and reading the two-dimensional graphic code with the camera of mobile device.

5. The low-energy consumption Bluetooth IoT device provided by the present invention transmits data in an electronic way, thereby minimizing unnecessary manual input and avoiding errors caused by manual input, so as to improve the correctness of data transmission.

6. The low-energy consumption Bluetooth IoT device of the present invention provides a preset program that can be customized according to the requirements, and uses the mobile device as a medium for connecting to the cloud server and objects or devices, and the mobile device can be preinstalled with the corresponding App, so that the present invention can be applied to a variety of atmospheres and has a wide range of applications.

The description referred to in the drawings and stated above is only for the preferred embodiments of the present invention. Many equivalent variations and modifications can still be made by those skilled at the field related with the present invention and do not depart from the spirit of the present invention, so they should be regarded to fall into the scope defined by the appended claims.

To sum up, the low-energy consumption Bluetooth IoT device of the present invention can indeed meet its anticipated object and can be applied to the currently available relative device, which is highly applicable to all kinds of industry.

What is claimed is:

1. A low-energy consumption Bluetooth Internet of Things device comprises:
an input interface connected with an external device for receiving a current external message code of said external device, wherein said current external message code is correlated with a current external information of said external device and a current parameter code of said external device;
a processing module connected with said input interface, wherein said processing module converts said current external message code into said current parameter code;
a Bluetooth module connected with said processing module, wherein said processing module transmits said current parameter code to said Bluetooth module, and said Bluetooth module broadcasts said current parameter code, wherein a mobile device receives said current parameter code by a mobile-device Bluetooth module of said mobile device and uploads said current parameter code to a cloud server, said cloud server converts said current parameter code into a current cloud information and stores said current cloud information in said cloud server; and
a display module connected with said processing module, wherein a plurality of bit-series codes are pre-stored in said processing module, and said processing module searches out a current bit-series code corresponding to said current parameter code from said plurality of bit-series codes, and then said processing module converts said current bit-series code into a current two-dimensional graphic code and transmits said current two-dimensional graphic code to said display module to display said current two-dimensional graphic code, wherein when said mobile-device Bluetooth module is unable to successfully receive said current parameter code, a mobile device camera module of said mobile device is able to read said current two-dimensional graphic code displayed by said display module; wherein (1) said mobile device converts said current two-dimensional graphic code into said current cloud information, and then uploads said current cloud information to said cloud server, and said current cloud information is stored in said cloud server; or (2) said mobile device uploads said current two-dimensional graphic code to said cloud server, and said cloud server converts said current two-dimensional graphic code into said current cloud information and stores said current cloud information in said cloud server; wherein said current cloud information is correlated with said current external information of said external device.

2. The low-energy consumption Bluetooth Internet of Things device according to claim 1, wherein said Bluetooth module is an iBeacon module compatible with Bluetooth Low Energy 4.0 protocol (Bluetooth Low Energy 4.0).

3. The low-energy consumption Bluetooth Internet of Things device according to claim 1, wherein said input interface is at least one selected from the group consisting of: a universal serial bus (USB) interface, a PS/2 interface, and an RS232 interface.

4. The low-energy consumption Bluetooth Internet of Things device according to claim 1, wherein said current two-dimensional graphic code is a Quick Response Code.

5. The low-energy consumption Bluetooth Internet of Things device according to claim 1, wherein said display module is an electronic paper display.

6. The low-energy consumption Bluetooth Internet of Things device according to claim 1, wherein said current two-dimensional graphic code displayed by said display module is dynamically changing according to the change of said current external information of said external device or dynamically changing over a time interval.

7. The low-energy consumption Bluetooth Internet of Things device according to claim 1, wherein said plurality of bit-series codes are converted from a plurality of two-dimensional graphic codes, and said plurality of two-dimensional graphic codes are converted from a plurality of cloud information; wherein said plurality of cloud information are corresponding to a plurality of parameter codes and a plurality of external information of said external device, wherein said plurality of bit-series codes are pre-stored in said processing module by connecting an external installation device to said input interface.

8. The low-energy consumption Bluetooth Internet of Things device according to claim 7, wherein each of said plurality of cloud information is an Uniform Resource Locator.

9. The low-energy consumption Bluetooth Internet of Things device according to claim 1, wherein said current cloud information is a current Uniform Resource Locator, and a web page of said current Uniform Resource Locator is correlated with said current external information of said external device.

10. The low-energy consumption Bluetooth Internet of Things device according to claim 1, further comprising a power module for supplying the power required by said low-energy consumption Bluetooth Internet of Things device.

11. A low-energy consumption Bluetooth Internet of Things device comprises:
  an input interface connected with an external device for receiving a current parameter code of said external device, wherein said current parameter code is correlated with a current external information of said external device;
  a processing module connected with said input interface;
  a Bluetooth module connected with said processing module, wherein said processing module transmits said current parameter code to said Bluetooth module, and said Bluetooth module broadcasts said current parameter code, wherein a mobile device receives said current parameter code by a mobile-device Bluetooth module of said mobile device and uploads said current parameter code to a cloud server, said cloud server converts said current parameter code into a current cloud information and stores said current cloud information in said cloud server; and
  a display module connected with said processing module, wherein a plurality of bit-series codes are pre-stored in said processing module, and said processing module searches out a current bit-series code corresponding to said current parameter code from said plurality of bit-series codes, and then said processing module converts said current bit-series code into a current two-dimensional graphic code and transmits said current two-dimensional graphic code to said display module to display said current two-dimensional graphic code, wherein when said mobile-device Bluetooth module is unable to successfully receive said current parameter code, a mobile device camera module of said mobile device is able to read said current two-dimensional graphic code displayed by said display module; wherein (1) said mobile device converts said current two-dimensional graphic code into said current cloud information, and then uploads said current cloud information to said cloud server, and said current cloud information is stored in said cloud server; or (2) said mobile device uploads said current two-dimensional graphic code to said cloud server, and said cloud server converts said current two-dimensional graphic code into said current cloud information and stores said current cloud information in said cloud server; wherein said current cloud information is correlated with said current external information of said external device.

12. The low-energy consumption Bluetooth Internet of Things device according to claim 11, wherein said Bluetooth module is an iBeacon module compatible with Bluetooth Low Energy 4.0 protocol (Bluetooth Low Energy 4.0).

13. The low-energy consumption Bluetooth Internet of Things device according to claim 11, wherein said input interface is at least one selected from the group consisting of: a universal serial bus (USB) interface, a PS/2 interface, and an RS232 interface.

14. The low-energy consumption Bluetooth Internet of Things device according to claim 11, wherein said current two-dimensional graphic code is a Quick Response Code.

15. The low-energy consumption Bluetooth Internet of Things device according to claim 11, wherein said display module is an electronic paper display.

16. The low-energy consumption Bluetooth Internet of Things device according to claim 11, wherein said current two-dimensional graphic code displayed by said display module is dynamically changing according to the change of said current external information of said external device or dynamically changing over a time interval.

17. The low-energy consumption Bluetooth Internet of Things device according to claim 11, wherein said plurality of bit-series codes are converted from a plurality of two-dimensional graphic codes, and said plurality of two-dimensional graphic codes are converted from a plurality of cloud information; wherein said plurality of cloud information are corresponding to a plurality of parameter codes and a plurality of external information of said external device, wherein said plurality of bit-series codes are pre-stored in said processing module by connecting an external installation device to said input interface.

18. The low-energy consumption Bluetooth Internet of Things device according to claim 17, wherein each of said plurality of cloud information is an Uniform Resource Locator.

19. The low-energy consumption Bluetooth Internet of Things device according to claim 11, wherein said current cloud information is a current Uniform Resource Locator, and a web page of said current Uniform Resource Locator is correlated with said current external information of said external device.

20. The low-energy consumption Bluetooth Internet of Things device according to claim 11, further comprising a power module for supplying the power required by said low-energy consumption Bluetooth Internet of Things device.

* * * * *